United States Patent
Goto et al.

[11] Patent Number: 5,712,030
[45] Date of Patent: Jan. 27, 1998

[54] SINTERED BODY INSERT FOR CUTTING AND METHOD OF MANUFACTURING THE SAME

[75] Inventors: Mitsuhiro Goto; Satoru Kukino; Kenichi Kikutani; Tetsuo Nakai, all of Hyogo, Japan

[73] Assignee: Sumitomo Electric Industries Ltd., Osaka, Japan

[21] Appl. No.: 563,936

[22] Filed: Nov. 29, 1995

[30] Foreign Application Priority Data

Dec. 1, 1994 [JP] Japan ................... 6-298498
Nov. 1, 1995 [JP] Japan ................... 7-285019

[51] Int. Cl.⁶ ........................................ B23B 27/16
[52] U.S. Cl. .................. 428/332; 428/216; 428/408; 428/457; 428/697; 428/698; 428/699; 407/119
[58] Field of Search ........................ 428/332, 408, 428/336, 216, 698, 699, 697, 469; 407/119, 118; 175/434, 420.2; 76/DIG. 12

[56] References Cited

U.S. PATENT DOCUMENTS

| | | | |
|---|---|---|---|
| 3,369,283 | 2/1968 | Colding | 407/118 |
| 4,255,165 | 3/1981 | Dennis et al. | 175/434 |
| 4,437,800 | 3/1984 | Araki et al. | 407/119 |
| 4,448,591 | 5/1984 | Ohno | 407/119 |
| 4,714,660 | 12/1987 | Gates, Jr. | 428/699 |
| 4,984,940 | 1/1991 | Bryant et al. | 428/698 |
| 5,135,961 | 8/1992 | Newton, Jr. | 407/119 |
| 5,199,832 | 4/1993 | Meskin et al. | 76/DIG. 12 |
| 5,299,471 | 4/1994 | Tank et al. | 76/DIG. 12 |
| 5,370,195 | 12/1994 | Keshavan et al. | 175/420.2 |
| 5,437,343 | 8/1995 | Cooley et al. | 175/434 |
| 5,478,634 | 12/1995 | Setoyama et al. | 428/699 |

FOREIGN PATENT DOCUMENTS

59-129775  7/1984  Japan.

Primary Examiner—Archene Turner
Attorney, Agent, or Firm—W. G. Fasse; W. F. Fasse

[57] ABSTRACT

A sintered body insert for cutting comprises an intermediate layer consisting of at least one of cemented carbide, a ferrous metal and a high melting point metal, and a first layer and a second layer, each consisting of hard sintered bodies containing cubic boron nitride or diamond, which are arranged on opposite sides respectively above and below with the intermediate layer therebetween. The first and second layers are bonded to the intermediate layer by sintering. The is so formed or configured that its front and rear surfaces define cutting faces. All noses and flanks involved in cutting are formed on the first layer and the second layer, while the centers of gravity of the cutting faces and of the overall insert are located at positions on or in the intermediate layer. Further, coating layers consisting of a nitride of an element belonging to the group 4a, 5a or 6a of the periodic table or other components are formed on the surfaces of the cutting faces and the flanks. With this structure, it is possible to provide a sintered body insert for cutting which is prolonged in life and excellent in economy such as the manufacturing cost.

20 Claims, 10 Drawing Sheets

SINTERED BODY INSERT FOR CUTTING AND METHOD OF MANUFACTURING THE SAME

BACKGROUND OF THE INVENTION

1. Field of the Invention

The present invention relates to a hard sintered body insert for cutting consisting of a composite sintered body which is prepared from cubic boron nitride (hereinafter referred to as "CBN") or diamond and cemented carbide or the like, a coated sintered body insert for cutting which is prepared by coating the sintered body insert for cutting with a wear-resistant layer, and a method of manufacturing the same.

2. Description of the Background Art

In general, a diamond or CBN sintered body is widely used for a cutting tool such as a tool used for cutting on a lathe. Such a sintered body tool is manufactured using extremely high-priced equipment which can generate a superhigh pressure of at least 40 kb and a high temperature of 1300° C.

In order to prepare tools from such a sintered body, there is first obtained a discoidal composite sintered body 3 comprising a cemented carbide layer 1 and a layer 2 consisting of the sintered body which is bonded to an upper surface of the cemented carbide layer 1, as shown in FIG. 7. This composite sintered body 3 is cut by a wire electrodischarge machine into desired shapes of cutting edges (3a and 3b shown in FIGS. 8A and 8B), which are brazed to cemented carbide base materials of desired shapes (4 and 5 in FIGS. 8A and 8B). Inserts for cutting can be obtained by grinding and/or polishing such substances, as shown in FIGS. 8A and 8B. Referring to FIGS. 8A and 8B, boundary surfaces shown by arrows A and B are brazed surfaces.

The triangular insert for cutting shown in FIG. 8B is provided in its center with a through hole 6 for fastening/fixing the insert to a shank of a tool by screwing.

A conventional tool employing such an insert for cutting is economically excellent in so far as it surely provides a sintered body area which is necessary and sufficient for actual cutting, but the following problems are caused due to the brazed portion.

The tool employing a diamond or CBN sintered body, which is used for finishing with a small depth of cut or at a low feed rate in general, is frequently used for high-speed cutting under a high cutting temperature, due to its characteristics of high hardness and excellent heat resistance. In recent years, the range of applications of high speed cutting is expanding through requirements for improvement in working efficiency.

A conventional brazed tool is prepared at a brazing temperature of about 700° to 900° C. In high-speed cutting of hardened steel or cast iron, however, the cutting temperature exceeds 900° C. such that the brazing filler metal may melt. In rough cutting of an Al—Si alloy, hardened steel or cast iron, on the other hand, the brazing strength is rendered insufficient due to increase in cutting resistance although the cutting temperature is not more than 900° C., which would cause de-brazing. When a diamond sintered body is brazed at a high temperature close to 900° C. in order to attain sufficient brazing strength, the sintered body may be partially graphitized or cracked due to remarkable difference in thermal expansion coefficient between the sintered body and a cemented carbide base material.

Further, a method of manufacturing such a conventional insert for cutting requires a number of steps, including a step of forming the sintered body shown in FIG. 7, a wire electrodischarge step, a step of grinding and/or polishing the cut composite sintered body, a brazing step and a step of grinding and/or polishing the insert for cutting, as compared with a method of manufacturing tools of cemented carbide and ceramics.

FIGS. 9A, 9B and 9C illustrate shapes of commercially available inserts 10a, 10b and 10c for cutting, which are conventional tools having no brazed portions. In the insert 10a for cutting shown in FIG. 9A, only the overall upper surface (cutting face) is made of a CBN or diamond sintered body 9 on a base member 8. In the insert 10b for cutting shown in FIG. 9B, on the other hand, upper and lower cutting faces are entirely made of CBN or diamond sintered bodies a through a sandwich composite sintered body on a base or core member 8. Referring to FIG. 9C, further, the overall insert 10c for cutting is made of a CBN or diamond sintered body.

A problem which is common to these tools is that parts of the cutting faces not concerning cutting are also made of the high-priced CBN or diamond sintered bodies. In consideration of the manufacturing costs, therefore, these conventional inserts for cutting are not economically superior to the conventional brazed insert. Due to the hard sintered body layers provided on center of gravity portions of the cutting faces or of the overall inserts, further, it is difficult to form holes for fastening/fixing the inserts to holders, dissimilarly to the commercially available insert shown in FIG. 8B, for example.

CBN and diamond sintered bodies are applied to various types of cutting tools, due to excellent physical properties such as hardness, strength and thermal conductivity. A CBN sintered body is applied to a cutting tool for a ferrous material due to low reactivity with iron, and particularly utilized for cutting of a hard material that is difficult to cut such as hardened steel, for example.

On the other hand, it is known that a diamond sintered body is superior in hardness and strength to a CBN sintered body since diamond particles themselves are harder than CBN particles, have small cleavage planes and small defects in general, and are strongly bonded with each other. However, a commercially available diamond sintered body cannot be utilized for practical cutting of a ferrous material, due to inferior oxidation resistance and reduction in wear resistance through rich reactivity with a ferrous metal. However, diamond is applied to a cutting tool for a non-ferrous material such as aluminum, due to excellent wear resistance with respect to the non-ferrous material.

Under the present circumstances, however, sufficient wear resistance cannot be attained by only a CBN sintered body or diamond in cutting of a ferrous material, cutting of a non-ferrous material or co-cutting of ferrous and non-ferrous materials, under severe cutting conditions such as a high cutting speed and high efficiency.

In order to improve the wear resistance, there have been proposed methods of coating conventional inserts for cutting, consisting of CBN and diamond sintered bodies, with various wear-resistant layers of TiN or the like by PVD (physical vapor deposition) or CVD (chemical vapor deposition) (refer to Japanese Patent Laying-Open Nos. 61-183187 (1986), 1-96083 (1989) and 1-96084 (1989), for example). In order to form a coating layer which can withstand more-severe cutting conditions for high-speed finish cutting or rough cutting and a wear-resistant layer which is excellent in adhesion strength with respect to the sintered body, however, it is necessary to carry out coating at a high temperature exceeding the melting point of the brazing filler metal. Thus, a brazed tool is inappropriate as a base material for a coated insert for cutting. Even if the coating is carried out through PVD or CVD employing a low temperature process at a film forming temperature which is not more than the melting point of the brazing filler metal for applying the insert to a tool for light cutting such as ordinary finish cutting, a brazed portion may be disadvantageously etched or deteriorated through reaction with raw material gas components of the coating layer to cause de-brasing if a brazed tool is employed as a base material for the coated insert for cutting. Thus, this insert is inferior in stability to a coated insert for cutting having no brazed portion.

Further, each of CBN and diamond sintered bodies is simply black or brown in color. As hereinabove described, a cutting tool which is prepared from such a material is mainly adapted to finishing work under cutting conditions with small depth of cut and at a low feed rate. In relation to such a cutting tool, it is not so important to discriminate whether or not a cutting edge corner of a general brazed insert is used. In a brazed insert tool employing a number of corner parts as cutting edges, however, it is difficult to discriminate whether or not the corners are used through black or brown sintered body surfaces. Therefore, such a cutting tool is effectively coated with TiN or Ni. When such a brazed insert is employed, however, the temperature of the brazed portion may be so increased during coating that the brazing filler metal is melted to cause deviation, or the brazed portion may be deteriorated and displaced when the same is employed under severe cutting conditions.

SUMMARY OF THE INVENTION

In consideration of the aforementioned problems of the prior art, an object of the present invention is to provide a hard sintered body insert for cutting which is improved in economy and can be readily coated with any coating layer, by employing a manufacturing method having a small number of manufacturing steps and providing an insert geometry which can efficiently utilize a CBN or diamond sintered body part.

Another object of the present invention is to provide an ideal coated CBN sintered body insert and a coated diamond sintered body insert having both the high hardness and strength of CBN and diamond sintered bodies and the excellent wear resistance of coating layers, and exhibiting extremely longer working lives as compared with a conventional tool upon application to cutting of hardened steel, rough cutting of cast iron or co-cutting of cast iron and an aluminum alloy, for example.

Still another object of the present invention is to provide a sintered body insert which simplifies discrimination as to whether or not a cutting edge corner is used after cutting.

In order to solve the aforementioned problems, a sintered body insert for cutting according to the present invention comprises an intermediate layer consisting of a material which is selected from a group consisting of cemented carbide, ferrous metals and high melting point metals, and first and second layers, consisting of hard sintered bodies containing cubic boron nitride or diamond, which are arranged on positions holding the intermediate layer from above and from below respectively and bonded to the intermediate layer by sintering, and is so formed that its front and rear surfaces define cutting faces. All noses R and flanks concerning or used for cutting are formed on the first and second layers, while the intermediate layer is formed to include center of gravity portions of the cutting faces and the center of gravity of the overall insert.

This sintered body insert for cutting includes no brazed portions which are employed in a number of conventional tools, whereby the problem such as the de-brazing in high-speed cutting or rough cutting is avoided. Further, the center of gravity portions of the cutting faces and the center of gravity of the overall insert are made of any material selected from cemented carbide, ferrous metals and high melting point metals, whereby it is possible to readily form through holes for fastening/fixing the insert to a holder or grooves for accurately mounting the insert onto the holder by grinding or the like. In addition, the flanks concerning cutting are entirely formed by hard sintered body layers consisting of CBN or diamond, whereby the tool life can be increased. This is conceivably because distribution of stress which is applied in cutting is improved since the overall flanks ere formed by the sintered body layers having a higher Young's modulus as compared with other materials. Further, it is inferred that the tool life is desirably improved since the inventive insert contains no brazing filler metal which is inferior in hardness and rigidity as compared to the hard sintered body.

Along interfaces between the intermediate layer and the first and second layers, the insert preferably includes layers of at least one metal selected from a group consisting of elements belonging to the groups 4a, 5a and 6a of the periodic table, or at least one compound selected from nitrides, carbides and oxides of at least one element selected from the aforementioned group and solid solutions thereof, in order to attain improvement of bonding strength. It is possible to relax an influence exerted by thermal stress or actual stress which is caused upon high-speed cutting, rough cutting or coating, thereby providing a sound sintered body insert for cutting having no cracking, by providing layers of the aforementioned high melting point metal or a compound thereof having intermediate characteristics along the interfaces between the intermediate layer and the first and second layers, which are remarkably different in characteristic from each other.

The respective thicknesses of the first and second layers consisting of CBN or diamond sintered bodies are preferably at least 1 mm and less than 4 mm. If the thicknesses are less than 1 mm, crater wear is readily developed in portions other than the hard sintered body layers in cutting, to reduce the insert working life as the result. If the thicknesses are in excess of 4 mm, on the other hand, the sintered body layers are unnecessarily thickened disadvantageously in view of the manufacturing cost, although this does not exert an influence on the cutting performance.

Further, the thickness of the insert is preferably at least 1.5 mm and less than 5.0 mm. If the thickness is less than 1.5 mm, the aforementioned effect of increasing the tool life is insufficient while the life may be reduced due to damage of one side influencing the other side in cutting in the case of vertical double cutting. If the thickness is in excess of 5 mm, on the other hand, the areas of the sintered bodies are increased beyond necessity, which is undesirable in consideration of economy.

Further, the surfaces of the cutting faces or of both the cutting faces and the flanks ere preferably coated with thin films of at least one metal selected from a group consisting of elements belonging to the groups 4a, 5a and 6a of the periodic table, Al, Si and B, or at least one compound selected from nitrides, carbides and oxides of at least one element selected from the aforementioned group and solid solutions thereof. When the sintered body insert for cutting is coated with such thin films, wear resistance is so improved that it is possible to obtain an excellent cutting tool having both chipping resistance and wear resistance to be capable of withstanding severe cutting conditions. Further, the coating layers are so worn after cutting that surface portions of the sintered body insert are exposed and changed in color, whereby used corner portions of the insert are ready to discriminate.

Hardness of the thin films serving as coating layers is readily influenced by the base materials, and this influence is rendered remarkable as the thin films are reduced in thickness. According to the present invention, hard sintered bodies consisting of diamond (Hv=about 9000), which is the hardest material among existing substances, or CBN (Hv= about 2800 to 5000), which is the next hardest material after diamond sintered body, are employed as the base materials to attain an effect of maintaining hardness of the coating layers also under high temperature conditions in cutting, in addition to remarkable suppression of separation of the coating layers, which has been extremely problematic in the case of a coated cemented carbide tool having a base material of WC cemented carbide (Hv=about 1800) and a coating layer incapable of following elastic/plastic deformation of the base material, whereby wear resistance of the sintered insert for cutting can be remarkably improved.

According to the present invention, coating layers which are excellent in adhesion to the base materials are formed by ion plating PVD, plasma CVD or the like whereby elastic/plastic deformation of the coating layers is restricted through the interfaces between the base materials and the coating layers, whereby the coating layers are remarkably improved in hardness. Namely, hardness of the coating layers is improved by employment of the CBN or diamond sintered bodies as the base materials, to exhibit excellent wear resistance.

According to a preferred embodiment of the present invention, each of the aforementioned surface portions of the sintered body insert for cutting is coated with at least one film selected from a group consisting of:

(1) a (Ti, Al)N film;
(2) a superlattice multilayer compound film (hereinafter referred to as "superlattice multilayer compound film of TiN and AlN") which is formed by repeatedly stacking TiN and AlN layers to have a cubic X-ray diffraction pattern as a whole, so that the thickness of each layer is 0.2 nm to 20 nm.
(3) a superfine grain multilayer film (hereinafter referred to as "superfine grain multilayer film of TiN and AlN") having at least pairs of TiN and AlN layers with grain sizes of 1 nm to 50 nm in the respective layers; and
(4) a film of at least one compound selected from nitrides, carbides and oxides of Ti and solid solutions thereof.

It has been discovered that a singered body insert for cutting employing (Ti, Al)N films, superlattice multilayer compound films of TiN and AlN or superfine grain multilayer films of TiN and AlN as the coating layers is extremely improved in wear resistance. The reason for this is inferred to be as follows:

While a CBN or diamond sintered body tool has extremely high hardness and excellent wear resistance, the wear resistance may be extremely reduced under a high-temperature air atmosphere for cutting, since CBN reacts with oxygen at a temperature of about 900° C. to form $B_2O_3$, or diamond is graphitized at a temperature of about 600° C. to generate $CO_2$ through reaction with oxygen. Thus, it is conceivable that the inventive sintered body insert for cutting employing (Ti, Al)N films, superlattice multilayer compound films of TiN and AlN or superfine grain multilayer films of TiN and AlN which are superior in hardness and oxidation resistance to the CBN sintered bodies is improved in wear resistance as compared with an ordinary CBN or diamond sintered body tool.

According to another preferred embodiment of the inventive sintered body insert for cutting, a single film of $Al_2O_3$ or a multilayer film which is formed by stacking at least pairs of $Al_2O_3$ and TiCN layers is coated on the outer side of each coating layer.

According to still another preferred embodiment of the inventive sintered body insert for cutting, a single layer of $Al_2O_3$ or a multilayer film which is formed by stacking at least pairs of $Al_2O_3$ and TiCN layers is coated only on the outer side of the coating layer provided on each cutting face.

Due to such structure of the coating layers, crater wear resistance of the insert is further remarkably improved. This is conceivably because $Al_2O_3$, which is an oxide having superior thermal stability as compared to the (Ti, Al)N films, the superlattice multilayer compound films of TiN and AlN or the superfine grain multilayer films of TiN and AlN, attains an excellent effect since the rate of thermal wear is dominant as the factor of crater wear. In cutting a hard material that is difficult to cut such as hardened steel, coating of $Al_2O_3$ only at the rake face attains a good effect, since the rate of mechanical wear is dominant as a factor of flank wear. When at least pairs of $Al_2O_3$ and TiCN layers are stacked with each other to form a multilayer film, it is possible to suppress $Al_2O_3$ from entering a coarse columnar structure, whereby chipping resistance is further preferably improved.

In a further preferred embodiment of the inventive sintered body insert for cutting, the outermost layers of the coating layers provided on the cutting faces of the sintered body insert for cutting are coated with TiN.

The (Ti, Al)N films employed in the present invention can be formed by ordinary ion plating PVD. Superlattice multilayer compound films or superfine grain multilayer compound films of TiN and AlN or TiC and AlN can be formed by employing en ion plating apparatus which is provided with at least two types of metal targets and rotary base material holders. It is possible to form superlattice multilayer compound films or superfine grain multilayer compound films depending on differences between film forming temperatures, amounts of arc discharge and degrees of vacuum in introduction of gas such as $N_2$ gas or $C_2H_2$ gas. FIGS. 13A and 13B show a film forming apparatus for forming superlattice multilayer compound films of TiC and AlN.

In the film forming apparatus shown in FIGS. 13A and 13B, a chamber 51 is provided therein with a rotary susceptor 53 which is connected to a substrate power source 52 and rotary holders 54 which are fixed onto the same, and a plurality of base materials 55 are mounted on outer surfaces of the rotary holders 54. Further, a plurality of arc electrodes 57 and a plurality of metal targets 58 which are connected to arc power sources 56 are arranged on circumferences in the vicinity of the inner periphery of the chamber 51 respectively, so that metal ions are discharged from the metal targets 58 toward the base materials 55 by arch discharge across the arch electrodes 57 and the metal targets 58. Reaction gas is introduced from an inlet port 51a of the chamber 51, to carry out a film forming reaction with the metal ions on the base materials 55, and discharged from an outlet port 51b.

In the sintered body insert for cutting according to the present invention, the total film thickness of the coating layers is preferably at least 0.1 μm and not more than 15 μm in portions forming the cutting faces, and at least 0.1 μm and not more than 10 μm in portions forming the flanks.

If the total film thickness of the coating layers is less than 0.1 μm in the portions forming the cutting faces, the corner portions cannot be discriminated and wear resistance is hardly improved. If the total film thickness of the coating layers exceeds 15 μm, on the other hand, the characteristics attained by employing the CBN or diamond sintered bodies as base materials are lost while mechanically weak columnar crystals are easily developed, and hence dynamic characteristics of the coating layers themselves are so dominant that the insert is easy to chip. Further, the coating layers are so remarkably influenced by residual stress that the same are cracked or readily separated from the sintered body insert for cutting.

In the portions forming the flanks, on the other hand, mechanical wear is more dominant then thermal wear dissimilarly to the portions forming the cutting faces, and hence the total thickness of the coating layers is preferably at least 0.1 μm and not more than 10 μm in these portions.

In a method of manufacturing a sintered body insert for cutting according to the present invention, first formed is a sandwich sintered body having upper and lower layers consisting of hard sintered bodies containing cubic boron nitride or diamond, and an intermediate layer, consisting of a material selected from a group consisting of cemented carbide, ferrous metals and high melting point metals, which is held between the upper and lower layers. Then, electrodischarge machining is performed on the sandwich sintered body as formed to cut the same along four surfaces which are perpendicular to the upper and lower layers and to each other, thereby cutting out a composite sintered body insert in the form of a rectangular parallelopiped in which the upper, intermediate and lower layers are vertically aligned with or stacked on top of each other. Then, grinding or electrodischarge machining is performed on the composite sintered body insert as cut out, thereby forming a sintered body insert for cutting so that all noses R and flanks concerning cutting are formed by the upper and lower layers end the intermediate layer includes center of gravity portions of the cutting faces and the center of gravity of the overall insert.

According to this manufacturing method, the aforementioned sintered body insert for cutting can be formed through a relatively small number of steps with no requirement for a brazing step.

In a preferred embodiment, the method of manufacturing a sintered body insert for cutting according to the present invention further comprises a step of forming coating layers, consisting of at least one metal selected from a group consisting of elements belonging to the groups 4a, 5a and 6a of the periodic table, Al, Si and B, or at least one compound selected from nitrides, carbides end oxides of at least one element selected from the above group and solid solutions thereof, only on cutting faces or on both the cutting faces and flanks of the sintered body insert by PVD or CVD, in addition to the aforementioned steps.

According to this manufacturing method, the aforementioned sintered body insert for cutting having the coating layers can be formed through relatively simple steps with excellent adhesion.

The foregoing and other objects, features, aspects and advantages of the present invention will become more apparent from the following detailed description of present invention when taken in conjunction with the accompanying drawings.

DESCRIPTION OF THE PREFERRED EMBODIMENTS

Examples of the present invention are now described with reference to the drawings. The following Examples merely show partial embodiments of the present invention, and the present invention is not restricted to these Examples, as a matter of course.

EXAMPLE 1

Figure 2:
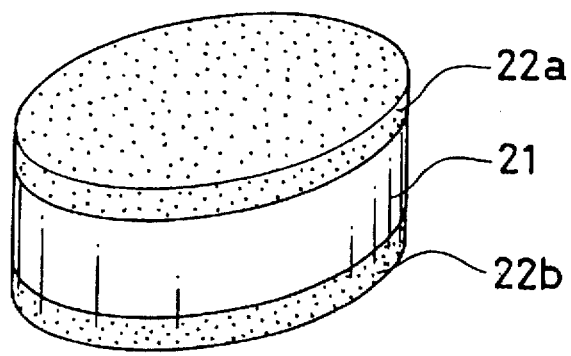
FIG. 2 is a perspective view showing a sandwich composite sintered body having a discoidal shape which is formed in a step of manufacturing a sintered body insert according to an Example of the present invention.

Mixed powder was prepared by blending 70 percent by volume of CBN powder and a rest of TiN, Al and unavoidable impurities. This mixed powder was charged in an Mo vessel and smoothly flattened. Thereafter a discoidal cemented carbide member was inserted in the Mo vessel, which in turn was further charged with powder and sintered through a superhigh pressure generator under 50 kb at 1440° C. for 30 minutes. The sintered Mo vessel was removed by grinding, to obtain a composite sintered body consisting of an intermediate cemented carbide layer 21 and CBN sintered body layers 22a and 22b, as shown in FIG. 2. The thicknesses of the cemented carbide layer 21 and the CBN sintered body layers 22a and 22b were 2.0 to 2.3 mm and 2.3 to 2.5 mm respectively. The CBN sintered body layers 22a and 22b were analyzed through X-ray diffraction, whereby CBN, TiN, AlN, $TiB_2$ and $AlB_2$ were detected along with unavoidable impurities of Co and Fe.

Figure 3A:
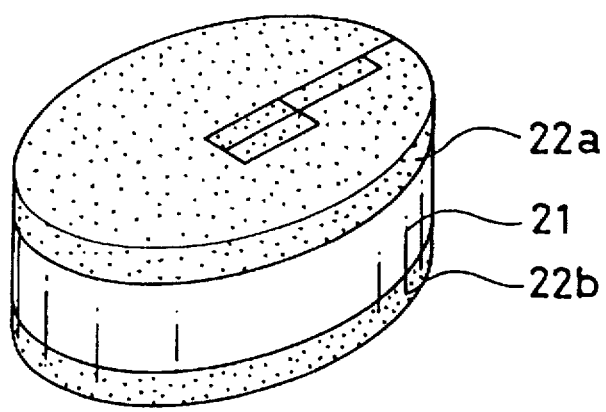
FIG. 3A is a perspective view showing cutting lines formed on a surface of the composite sintered body shown in FIG. 2 for cutting the same by electrodischarge machining.
Figure 3B:
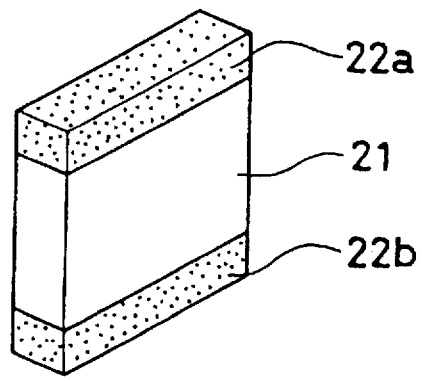
FIG. 3B is an enlarged perspective view showing a composite sintered body insert as being cut out by electrodischarge machining.

Then, this composite sintered body was cut by a wire electrodischarge machine along lines on its upper surface as shown in FIG. 3A, to obtain inserts each having a shape shown in FIG. 3B. Each insert was further worked with a grinder, to form a sintered body insert 23 for cutting having a substantially square major surface shape shown in FIG. 1A. The sintered body insert 23 for cutting comprises an intermediate layer 24 consisting of cemented carbide, and first and second layers 25a and 25b, consisting of CBN sintered bodies, which are arranged to hold the intermediate layer 24 therebetween from above and from below respectively. The intermediate layer 24 is so formed as to include center of gravity portions of cutting faces of the insert 23 for cutting and that of the overall insert 23 for cutting. Further, all noses R and flanks concerning cutting are formed on surfaces of the first and second layers 25a and 25b in respective corner portions of the sintered body insert 23 for cutting.

Figure 4A:
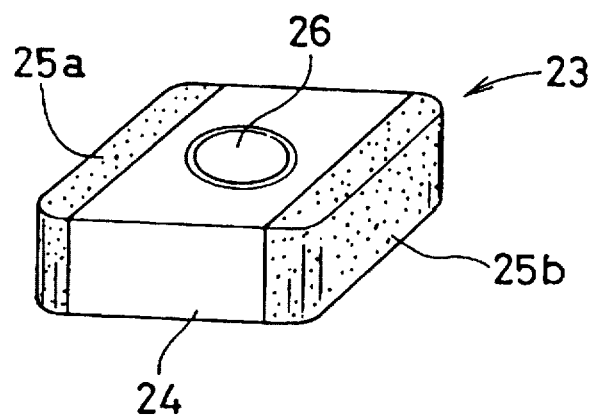
FIG. 4A is a perspective view showing a sintered body insert for cutting according to an Example of the present invention, provided at its center with a through hole for fastening the insert to a holder.
Figure 4B:
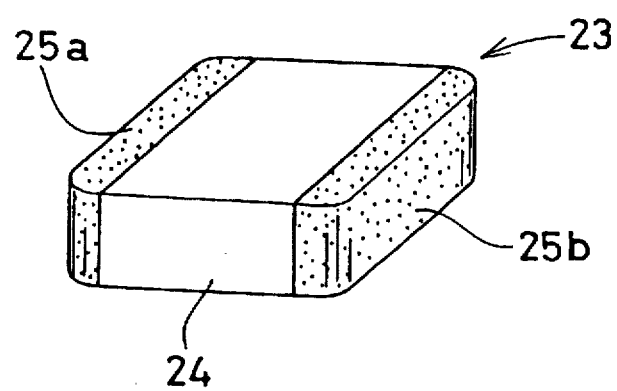
FIG. 4B is a perspective view of an insert which is similar in overall shape to that shown in FIG. 4A but not provided with a through hole in its center.
Figure 6A:
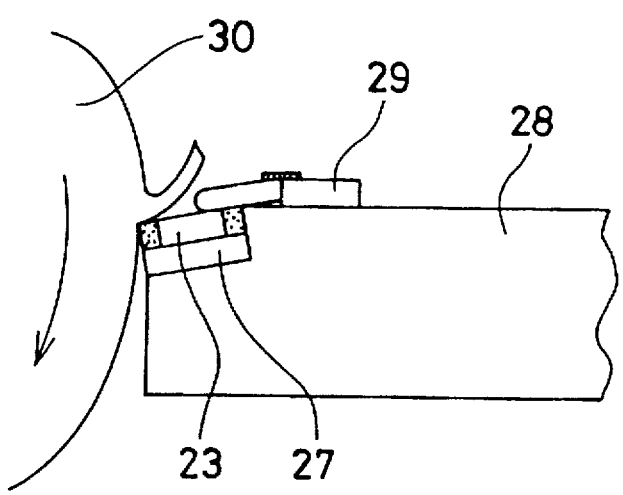
FIG. 6A illustrates an insert according to an Example of the present invention which is mounted on a holder for carrying out cutting.
Figure 6B:
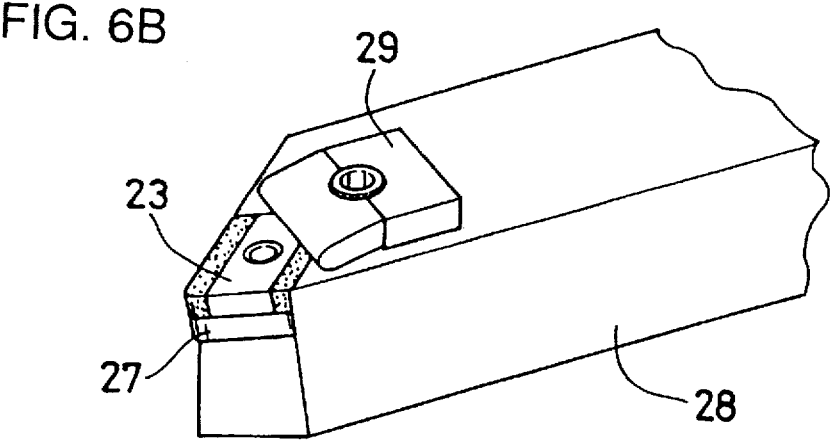
FIG. 6B is a perspective view illustrating the substantially square-shaped sintered body insert shown in FIG. 4A which is mounted on the holder.
Figure 6C:
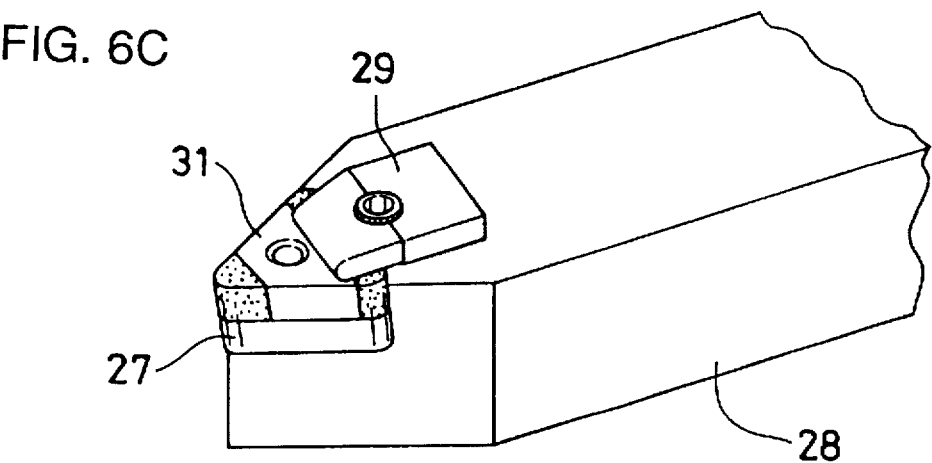
FIG. 6C is a perspective view illustrating the substantially equilateral-triangular shaped insert shown in FIG. 5 which is mounted on a holder.
Figure 7:
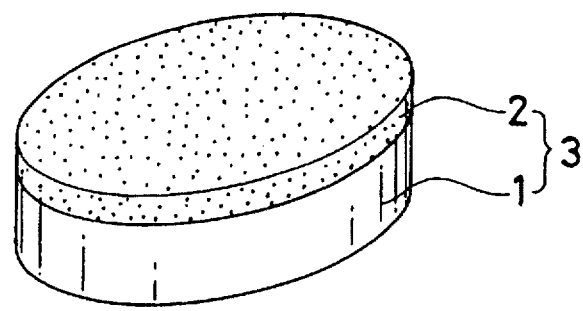
FIG. 7 is a perspective view showing a discoidal composite sintered body which is formed in a conventional step of manufacturing an insert for cutting employing a brazing stop.

Some of a plurality of sintered body inserts 23 for cutting which were formed in the aforementioned manner were respectively provided in the center of the intermediate layer 24 with a through hole 26 for fastening/fixing the insert 23 to a holder by screwing as shown in FIG. 4A while the remaining inserts were not provided with a through hole 26 but left in the state shown in FIG. 4B, and fixed to a holder 28 through a bottom board 27, as shown in FIGS. 6A, 6B and 6C.

In order to fasten/fix the insert 23 for cutting to the holder 28, a clamp member 29 was screwed to the upper surface of the holder 28 for pressing down the sintered body insert 23 for cutting as shown in FIGS. 6A and 6B, thereby preventing separation of the sintered body insert 23 from the holder 28. FIG. 6A is a side elevational view showing the sintered body insert 23 for cutting in a state cutting a rotating workpiece 30.

Figure 11A:
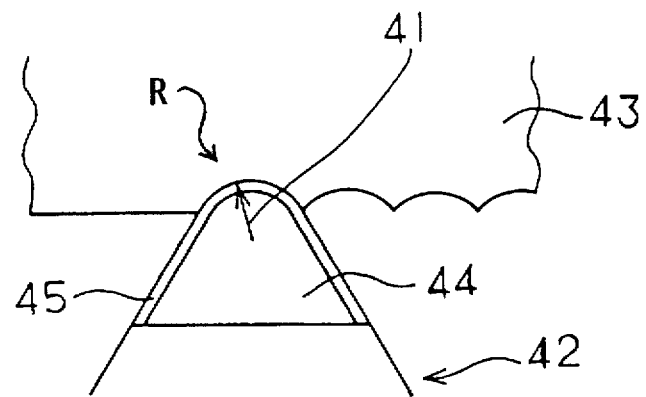
FIG. 11A is an enlarged plan view showing a forward end of an insert being used for cutting for illustrating a nose R and an NL plane of the insert for cutting.

Samples of the sintered body insert 23 for cutting according to Example 1 were prepared from SNMN090208 and SNGN090208 under the ISO standard, and the radius 41 of each nose R, the definition of which is illustrated in FIG. 11A for an insert 44 cutting a work piece 43, was set at 0.8 mm in every sample.

Figure 11B:
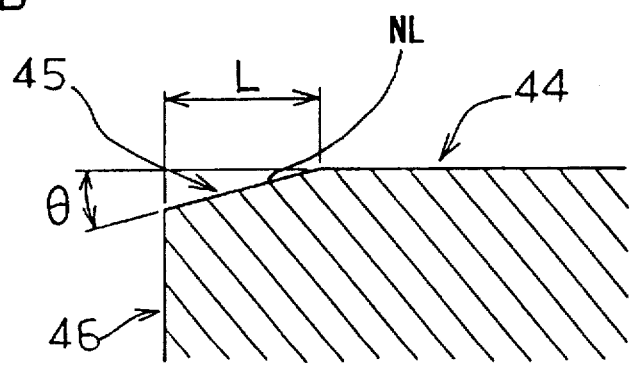
FIG. 11B is an enlarged sectional view showing a portion close to a cutting edge of an insert for illustrating a definition of an angle θ and a width L for specifying the shape of an NL plane.

As to the shape of the holder 28, a cutting edge inclination angle and a side rake angle were set at −5° and −6° respectively. As to the shape of each negative land (NL) surface 45 between the cutting face 44 and the flank surface 46 of an insert 44 of a cutting tool 42, as illustrated in FIG. 11B, the angle θ and the width L were set at 25° and 0.1 mm respectively in every sample.

Figure 9A:
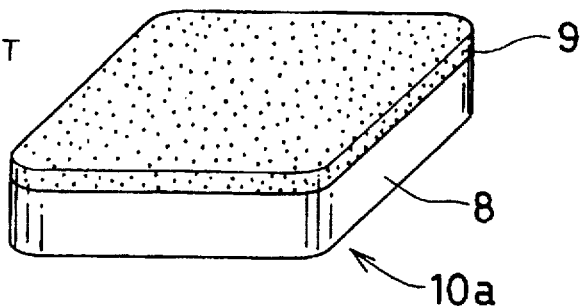
FIGS. 9A, 9B and 9C are perspective views showing three types of shapes of conventional sintered body inserts employing no brazing.
Figure 9B:
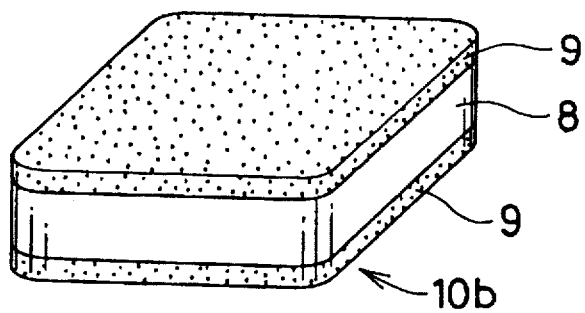
Figure 9C:
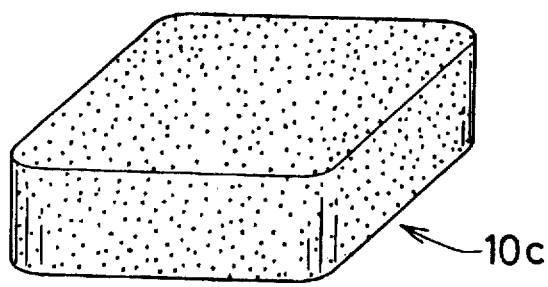
Figure 10A:
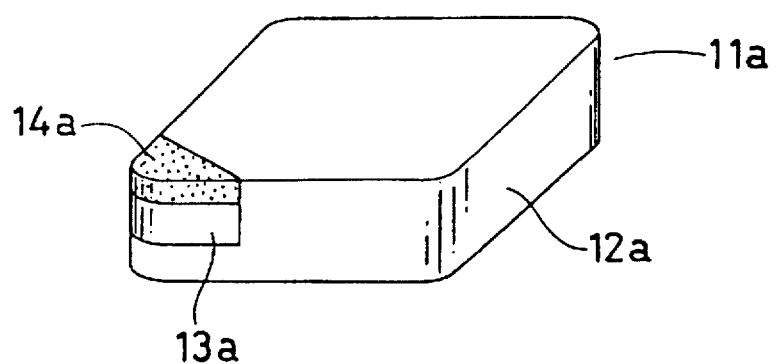
FIGS. 10A and 10B are perspective views showing shapes of two types of inserts employing brazing, which were employed as comparative samples in a cutting test in an Example of the present invention.
Figure 10B:
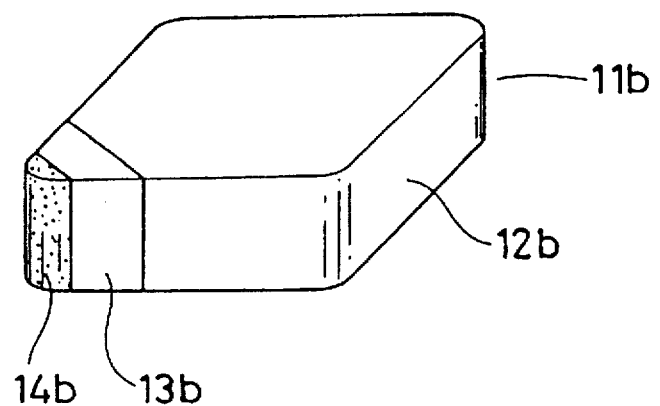

On the other hand, sintered bodies were prepared from the same mixed powder as that of Example 1 and subjected to brazing and molding thereon, thereby forming inserts 11a, 11b and 10a for cutting having shapes shown in FIGS. 10A, 10B and 9A respectively as comparative samples. Noses R of these comparative inserts for cutting and shapes of holders therefor were set identically to those of Example 1. In the inserts 11a and 11b shown in FIGS. 10A and 10B, cutting edge portions 14a and 14b are bonded/fixed to insert bodies 12a and 12b of cemented carbide by brazing through bottom boards 13a and 13b respectively.

The respective inserts 23 for cutting which were formed in the aforementioned manner were subjected to a cutting test under the following conditions:

Workplaces Round bar of SKD11 having hardness HRC60
Peripheral Cutting Speed: 180 m/min.
Depth of Cut: 0.4 mm
Feed Rate: 0.25 mm
Type of Cutting: Dry
Cutting Time: 20 minutes Table 1 shows the results of the cutting test.

TABLE 1

| Sample No. | Fig. No. | Type etc. | Flank Wear Width (mm) |
|---|---|---|---|
| 1-1 | FIG. 4(A) | SNMN090208 (ISO Standard) | 0.155 mm |
| 1-2 | FIG. 4(B) | SNGN090208 (ISO Standard) | 0.151 mm |
| 1-3 | FIG. 10(A) | ditto: Brazed | Sintered body came off in 10 minutes |
| 1-4 | FIG. 10(B) | ditto: Brazed | Sintered body came off in 10 minutes |
| 1-5 | FIG. 9(A) | ditto: With Cutting Faces of CBN | 0.160 mm, Chipped |

Note)
Sample No. 1-1, 1-2: Inventive Samples
1-3 to 1-5: Comparative Samples

EXAMPLE 2

Figure 1A:
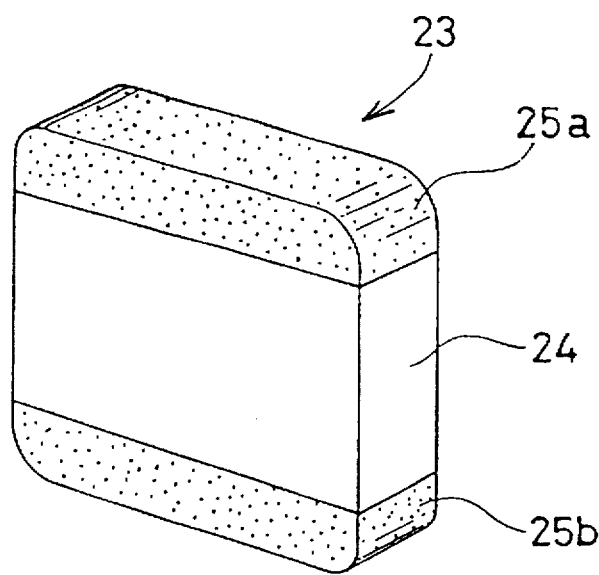
FIGS. 1A and 1B are perspective views showing two types of shapes of sintered body inserts according to Examples of the present invention.
Figure 1B:
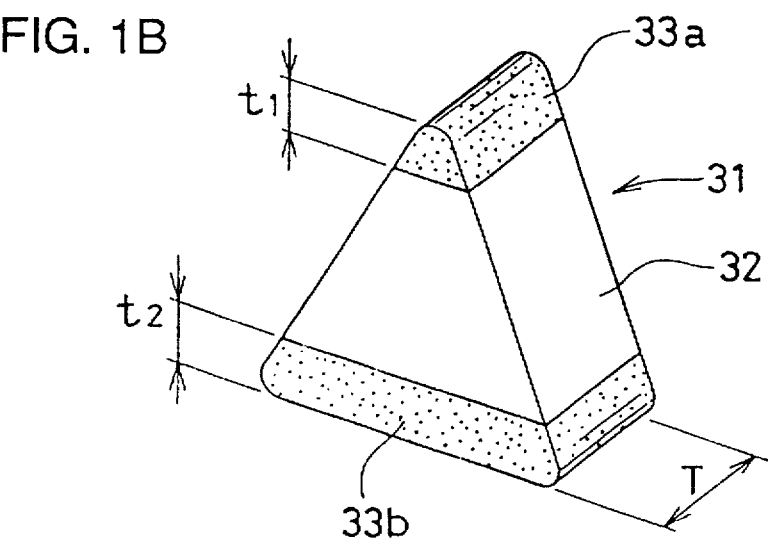

In a similar manner to Example 1, sintered body layers containing 60 percent by volume of CBN powder and a rest consisting of TiC, AlN, TiBz, $AlB_2$, WC and unavoidable impurities were worked into a sandwich CBN sintered body holding an intermediate layer 32 consisting of metal Mo therebetween, and the sandwich was then subjected to electrodischarge machining and grinding, to form an insert 31 for cutting substantially in the form of an equilateral triangle (TNGN type under JIS) shown in FIG. 1B.

Thicknesses ($t_1$ and $t_2$ shown in FIG. 1B) of first and second layers 33a and 33b, consisting of CBN sintered bodies, of the insert 31 for cutting were set through controlling the amounts of powder charged in formation of the sintered bodies and through controlling the wire cutting and grinding steps. Further, the thickness (T shown in FIG. 1B) of the overall insert 31 was set at a desired size through wire cutting and grinding of upper and lower surfaces. The cutting edge of the insert 31 for cutting was so processed that the radius of each nose R was 1.2 mm and each NL surface was at an angle θ of 25° and a width L of 0.1 mm. As shown in FIG. 6C, further, the insert 31 for cutting was fastened/fixed to a holder 28 through a bottom board 27, and a clamp member 29 was screwed to the holder 28 to press down the insert 31 for cutting.

On the other hand, a brazed insert for cutting was formed by sintered bodies having a composition similar to that of Example 2, as a comparative example.

Samples of the insert 31 for cutting which were formed in the aforementioned manner were subjected to a cutting test under the following conditions:

Workpiece: Round bar of FCD500 having hardness HB200

Peripheral Cutting Speed: 400 m/min.

Depth of Cut: 0.5 mm

Feed Rate: 0.2 mm

Type of Cutting: Dry

Table 2 shows the results of the cutting test. Referring to Table 2, the sample No. 2-9 is the brazed insert, which was prepared as a comparative example.

TABLE 2

| Sample No. | Thickness of CBN Layer (mm) | Thickness of Insert (mm) | Cuttable Time up to Chipping (min.) |
|---|---|---|---|
| 2-1 | 0.9 | 1.4 | 14 |
| 2-2 | 1.2 | 2.5 | 15 |
| 2-3 | 2.1 | 3.2 | 32 |
| 2-4 | 1.8 | 4.5 | 38 |
| 2-5 | 4.5 | 3.2 | 29 |
| 2-6 | 2.5 | 3.2 | 33 |
| 2-7 | 2.0 | 5.0 | 37 |
| 2-8 | 1.4 | 6.0 | 27 |
| 2-9 | 1.0 | 3.2 | 7 |

EXAMPLE 3

Samples of a sandwich sintered body comprising sintered body layers, containing 88 percent by volume of CBN and a rest or remainder consisting of borides and carbides of Co and W, AlN and unavoidable impurities, holding therebetween an intermediate layer consisting of any one of cemented carbide, a ferrous metal or a high melting point metal shown in Table 3, were formed in a similar manner to Example 1. Then, TiN layers were provided on interfaces in some of the samples as formed. Thereafter electrodischarge machining was performed on the samples of the composite sintered body as formed by a wire electrodischarge machine to cut out inserts, which in turn were subjected to measurement of interfacial strength values.

In Example 3, no working of the NL surface shown in FIG. 11B was carried out.

A comparative sample No. 3-6 was prepared by brazing cemented carbide members with each other as shown in Table 3, and the strength of the brazed surface was measured. The brazing filler metal was prepared from commercially available silver solder.

Table 3 shows the results of the aforementioned measurement.

TABLE 3

| Sample No. | Material of Intermediate Layer | Interfacial Layer | Shearing Strength (kg/mm²) |
|---|---|---|---|
| 3-1 | Cemented Carbide | No | 53 |
| 3-2 | Cemented Carbide | No | 55 |
| 3-3 | Mo | No | 40 |

TABLE 3-continued

| Sample No. | Material of Intermediate Layer | Interfacial Layer | Shearing Strength (kg/mm²) |
|---|---|---|---|
| 3-4 | SKH Steel | Yes | 58 |
| 3-5 | W | Yes | 65 |
| 3-6 | — | Silver Solder | 25 |

It is understood from the results shown in Table 3 that every inventive sample has higher shearing strength as compared with the comparative sample No. 3-6, regardless of the presence or absence of the interface.

EXAMPLE 4

A sandwich sintered body was formed by bonding sintered body layers containing 85 percent by volume of diamond and a rest consisting of Co, WC and unavoidable impurities, together with an intermediate layer consisting of metal Mo therebetween. Thereafter this sintered body was cut by a wire electrodischarge machine, and worked by grinding to form an insert for cutting.

In Example 4, no working of the NL surface shown in FIG. 11B was carried out. In general, no NL surface is worked in an insert having a cutting edge of a diamond sintered body.

The insert for cutting as formed was subjected to a cutting test under the following conditions:

Workpiece: Round bar of an aluminum alloy containing 18% of Si

Peripheral Cutting Speed: 900 m/min.

Depth of Cut: 1.0 mm

Feed Rate: 0.2 mm

Type of Cutting: Dry

A commercially available brazed insert was also subjected to the cutting test as a comparative example.

As the result of the cutting test, the insert for cutting according to Example 4 was capable of cutting workpieces with no chipping for 60 minutes, while a sintered body was displaced from a brazed portion in the comparative insert after cutting workpieces for 35 minutes.

EXAMPLE 5

First, mixed powder was prepared by blending 60 percent by volume of CBN with a rest or remainder consisting of TiCN, Al, WC and unavoidable impurities. Then, this powder was charged in an Mo vessel and smoothly flattened. Thereafter a discoidal cemented carbide member was inserted in the Mo vessel, which in turn was further charged with powder and sintered through a superhigh pressure generator under 50 kb at 1450° C. for 30 minutes. The sintered Mo vessel was removed by grinding, to obtain a composite sintered body consisting of an intermediate cemented carbide layer 21 and CBN sintered body layers 22a and 22b, as shown in FIG. 2. The thicknesses of the intermediate cemented carbide layer 21 and the CBN sintered body layers 22a and 22b were 1.8 to 2.0 mm and 2.0 to 2.2 mm respectively. The CBN sintered body layers 22a and 22b were analyzed through X-ray diffraction, whereby CBN, TiN, AlN, TiB$_2$, AlB$_2$, WC and Al$_2$O$_3$ were detected along with unavoidable impurities of Co and Fe.

Then, this composite sintered body was subjected to steps similar to those of Example 1, to form a sintered body insert 23 for cutting having a substantially square major surface shape shown in FIG. 1A. An intermediate layer 24, first and second layers 25a and 25b, noses R and flanks of this sintered body insert 23 for cutting were similar in basic structure to those of Example 1. In more concrete terms, the insert 23 was in the form of a rectangular parallelopiped having a substantially square major surface with an inscribed circle radius of 6 mm and a thickness of 2.5 mm, while the radius of each nose R was 0.8 mm.

Figure 12A:
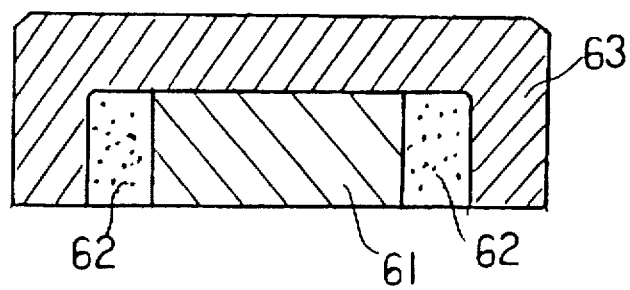
FIG. 12A is a typical sectional view of a sintered body chip having an ordinary unstacked coating layer.
Figure 12B:
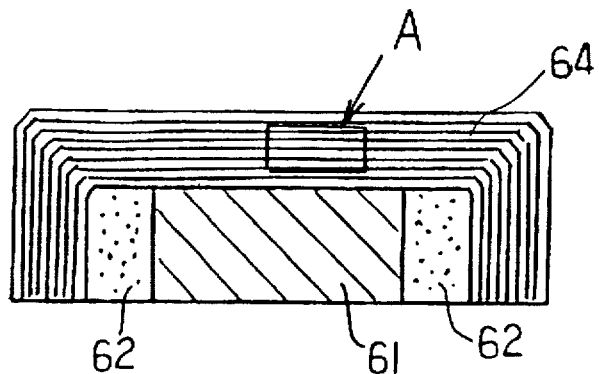
FIG. 12B is a typical sectional view showing a sintered body chip having a multilayer coating layer.
Figure 12C:
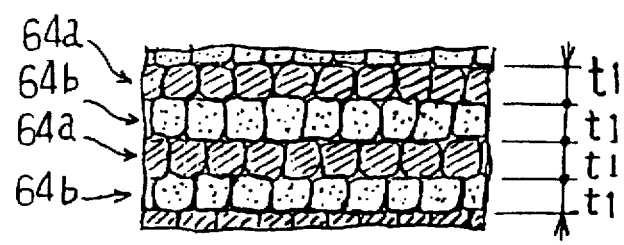
FIGS. 12C and 12D are typical enlarged sectional views showing a detail part A of FIG. 12D in relation to a superfine grain multilayer film and a superlattice multilayer film respectively.
Figure 12D:
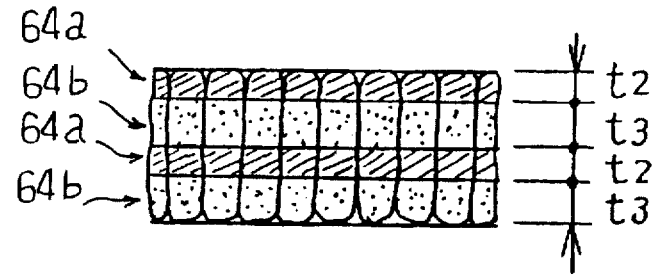

Coating layers shown in Tables 4 to 6 were formed on surfaces of samples of the sintered body insert 23 for cutting formed in the aforementioned manner, by PVD and CVD. FIGS. 12A to 12D are typical sectional views for illustrating states of coating layers of samples Nos. 4-8, 4-11 and 4-12. Referring to FIG. 12A, an unstacked coating layer 63 is formed on a surface of a composite sintered body of a cemented carbide layer 61 consisting of WC-Co and CBN sintered body layers 62. The sample No. 4-8 has this structure. On the other hand, FIG. 12B shows a structure having a multilayer coating layer 64. The coating layer 64 has a granular crystal structure as shown in FIG. 12C in an enlarged manner when the same consists of a superfine grain multilayer film, while the layer 64 has a columnar crystal structure as shown in FIG. 12D in an enlarged manner when the same consists of a superlattice multilayer compound film. Namely, the samples Nos. 4-11 and 4-12 have the coating layers shown in FIGS. 12C and 12D respectively.

Figure 13A:
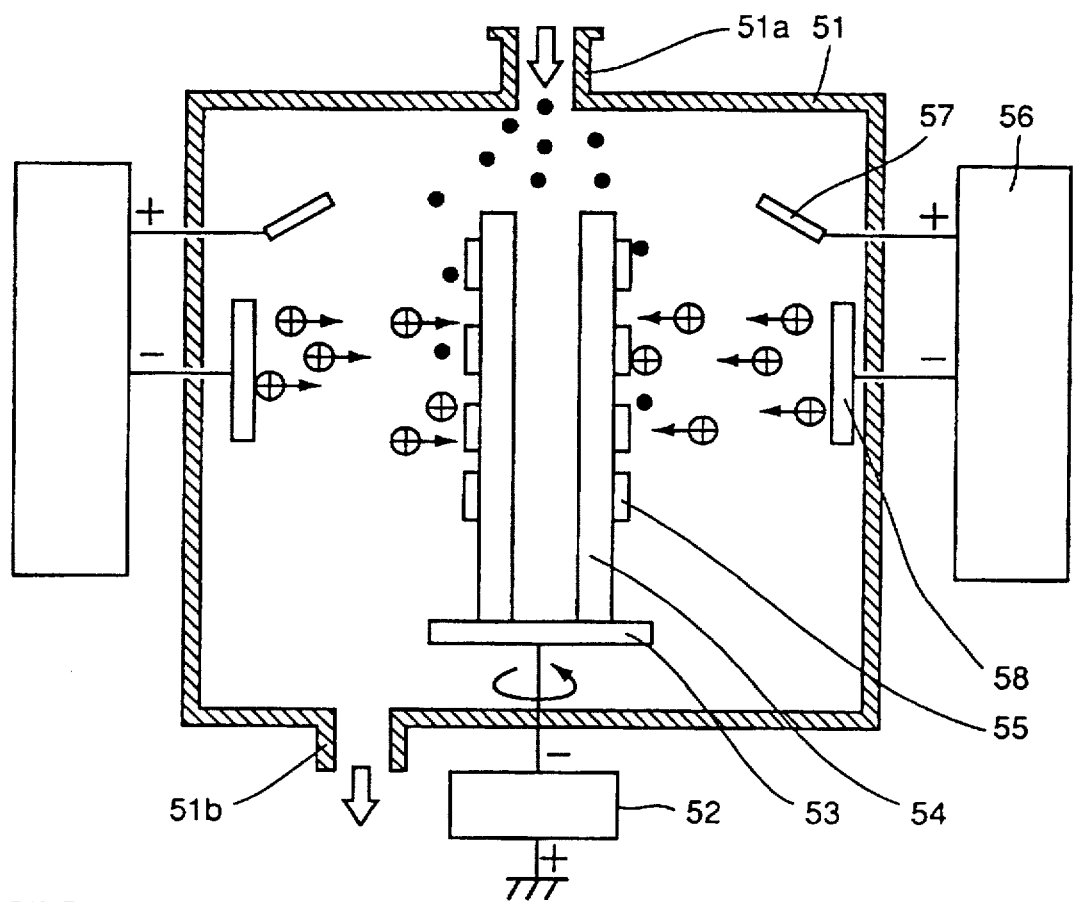
FIGS. 13A and 13B are front and to plan sectional views showing a film forming apparatus utilizing arc ion plating employed in Examples of the present invention.
Figure 13B:
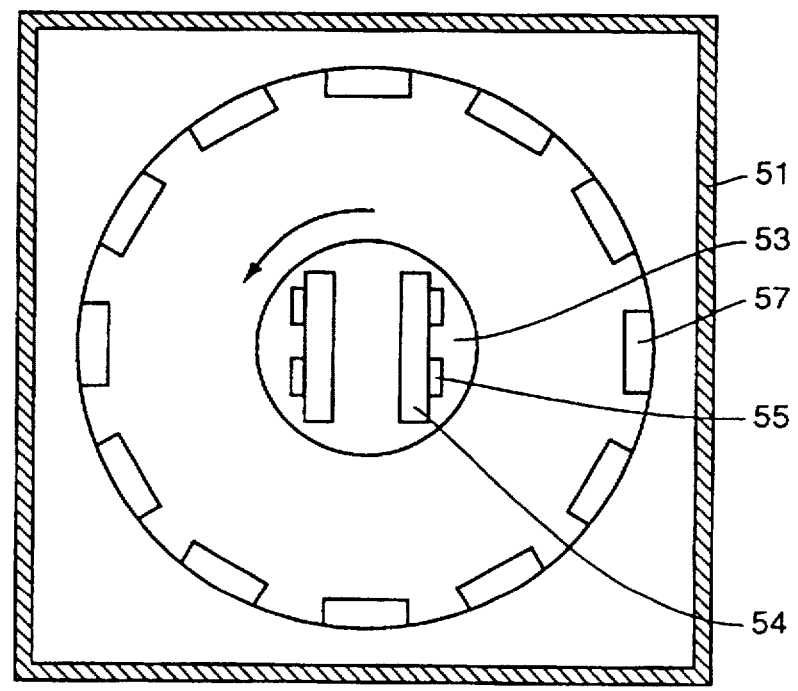

Samples Nos. 4-1 to 4-10 and 4-17 to 4-20 were prepared by ordinary arc ion plating PVD. On the other hand, samples Nos. 4-11 to 4-16, 4-21, 4-22, 4-26, 4-2 and 4-28 were formed through the following steps: The arc ion plating apparatus shown in FIGS. 13A and 13B was provided therein with an atmosphere at a vacuum of about $10^{-5}$ Torr, and thereafter Ar gas was introduced to maintain the atmosphere at about $10^{-2}$ Torr, while the apparatus was heated to about 400° C. The base material holders 54 were rotated and chips 55 were washed with application of voltages of about 800 V. Then, the Ar gas was discharged, and $N_2$ gas, $C_2H_2$ gas and $O_2$ gas were introduced into the apparatus at rates of 100 cc/min. to 300 cc/min. At least two targets 58 of Ti, Zr, Cr, Nb, B, Si and Al were evaporated/ionized by vacuum arc discharge, to alternately stack TiN and AlN layers, TiN and $Si_3N_4$ layers, NbC and AlN layers, CrN and AlN layers, TiC and AlN layers, TiCN and AlN layers, ZrN and AlN layers, and TiN and BN layers on the chips respectively. Surfaces of these multilayer films were lapped, and thereafter subjected to X-ray diffraction, whereby X-ray diffraction patterns of all superlattice multilayer compound films exhibited cubic structures, while those of all superfine grain multilayer films exhibited mixed layers.

Figure 8A:
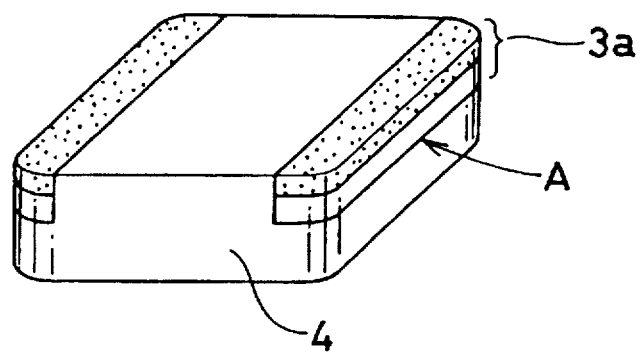
FIGS. 8A and 8B are perspective views showing two types of shapes of conventional inserts prepared by bonding cutting edge portions cut out from the composite sintered body shown in FIG. 7 to insert bodies by brazing.

On the other hand, a conventional tool having no brazed portion shown in FIG. 9A and brazed inserts shown in FIGS. 8A, 10A and 10B were prepared from the same powder as the above, as comparative samples.

The samples Nos. 4-1 to 4-28 of the sintered body insert 23 for cutting formed in the aforementioned manner were subjected to a cutting test under the following conditions:

Workpiece: Carburized/quenched SCM415 member having hardness HRC60

Cutting Speed: 150 m/min.

Depth of Cut: 0.2 mm

Feed Rate: 0.1 mm/rev.

Type of Cutting: Dry

Cutting Time: 40 minutes

Tables 4 to 6 show the results of flank wear widths after the cutting test.

TABLE 4

| | Structure and Thickness of Coating Layer on Flank | | | Flank | |
|---|---|---|---|---|---|
| Sample No. | First Layer Composition | Outermost Layer Composition | Average Film Thickness (μm) | Wear Width (mm) | Situation of Corner Portion |
| 4-1 | TiN | — | 0.05 | 0.205 | Undiscriminable |
| 4-2 | TiN | — | 0.1 | 0.210 | Discriminable |
| 4-3 | TiN | — | 9 | 0.205 | Discriminable |
| 4-4 | TiN | — | 11 | — | Coating layer chipped in 5 minutes |
| 4-5 | TiC | — | 5 | 0.165 | Discriminable |
| 4-6 | TiCN | — | 5.5 | 0.155 | Discriminable |
| 4-7 | TiCNO | — | 5 | 0.160 | Discriminable |
| 4-8 | $(Ti_{0.5}, Al_{0.5})N$ | — | 5 | 0.110 | Undiscriminable |
| 4-9 | $(Ti_{0.5}, Al_{0.5})C$ | — | 5.5 | 0.115 | Undiscriminable |
| 4-10 | $(Ti_{0.5}, Al_{0.5})C_{0.5}N_{0.5}$ | — | 5 | 0.105 | Undiscriminable |

TABLE 5

| | Structure and Thickness of Coating Layer on Flank | | | Flank | |
|---|---|---|---|---|---|
| Sample No. | First Layer Composition | Outermost Layer Composition | Average Film Thickness (μm) | Wear Width (mm) | Situation of Corner Portion |
| 4-11 | Alternately stacked TiN layers (10 nm) and AlN layers (10 nm) (Ultrafine stacked layer film) | — | 5.5 | 0.115 | Undiscriminable |
| 4-12 | Alternately stacked TiN layers (5 nm) and | — | 5 | 0.085 | Undiscriminable |

TABLE 5-continued

| | Structure and Thickness of Coating Layer on Flank | | Flank | |
|---|---|---|---|---|
| Sample No. | First Layer Composition | Outermost Layer Composition | Average Film Thickness (μm) | Wear Width (mm) | Situation of Corner Portion |

| Sample No. | First Layer Composition | Outermost Layer Composition | Average Film Thickness (μm) | Wear Width (mm) | Situation of Corner Portion |
|---|---|---|---|---|---|
| 4-13 | Alternately stacked TiC layers (5 nm) and AlN layers (3 nm) (Superlattice stacked layer compound film) | — | 5.5 | 0.090 | Undiscriminable |
| 4-14 | Alternately stacked TiCN layers (5 nm) and AlN layers (3 nm) (Superlattice stacked layer compound film) | — | 5.5 | 0.090 | Undiscriminable |
| 4-15 | Alternately stacked ZrN layers (5 nm) and AlN layers (3 nm) (Superlattice stacked layer compound film) | — | 5 | 0.095 | Undiscriminable |
| 4-16 | Alternately stacked TiN layers (5 nm) and BN layers (3 nm) (Superlattice stacked layer compound film) | — | 5 | 0.105 | Undiscriminable |
| 4-17 | Au | — | 0.1 | 0.210 | Discriminable |
| 4-18 | Ni | — | 1 | 0.210 | Discriminable |
| 4-19 | Ti | — | 1 | 0.205 | Discriminable |

TABLE 6

| | Structure and Thickness of Coating Layer on Flank | | | | | |
|---|---|---|---|---|---|---|
| | First Layer | | Outermost Layer | | | |
| Sample No. | Composition | Average Film Thickness (μm) | Composition | Average Film Thickness (μm) | Average Film Thickness (μm) | Flank Wear Width (mm) | Situation of Corner Portion |
| 4-20 | $(Ti_{0.5}Al_{0.5})N$ | 4.5 | TiN | 0.5 | 5 | 0.090 | Discriminable |
| 4-21 | Alternately stacked TiN layers (3 nm) and AlN layers (3 nm) (Superlattice stacked layer compound film) | 4.5 | TiN | 0.5 | 5 | 0.085 | Discriminable |
| 4-22 | Alternately stacked TiN layers (3 nm) and AlN layers (3 nm) (Superlattice stacked layer compound film) | 5 | Au | 1.0 | 5.1 | 0.120 | Discriminable |
| 4-23 | Brazed insert shown in FIG. 9A (with no coating layer) | | | | — | 0.210 | Undiscriminable |
| 4-24 | Brazed insert shown in FIG. 8A (with no coating layer) | | | | — | 0.225 | Undiscriminable |
| 4-25 | $(Ti_{0.5}Al_{0.5})N$ (Brazed insert shown in FIG. 10A) | | | — | 5 | — | De-brazed in 30 minutes |
| 4-26 | Alternately stacked TiN layers (10 nm) and $Sl_3N_4$ layers (10 nm) (Ultrafine stacked layers film) | | | — | 5.2 | 0.125 | Undiscriminable |
| 4-27 | Alternately stacked NbC layers (5 nm) and AlN layers (3 nm) (Superlattice stacked layers compound film). | | | — | 5.0 | 0.120 | Undiscriminable |
| 4-28 | Alternately stacked CrN layers (5 nm) and AlN layers (3 nm) (Superlattice stacked layers Compound film) | | | — | 5.2 | 0.115 | Undiscriminable |

As understood from the results shown in Tables 4 to 6, it was easier to discriminate used corners in samples Nos. 4-2, 4-3 and 4-17 to 4-19 which were provided with the coating layers according to Example 5 as compared with a comparative sample No. 4-23. In samples Nos. 4-5 to 4-7, furthermore, it was easier to discriminate used corners as compared with the comparative sample No. 4-23, and the inserts were remarkably improved in wear resistance as compared with the comparative samples Nos. 4-23 and 4-24. Samples Nos. 4-8 to 4-16 were remarkably improved in wear resistance as compared with the comparative samples Nos. 4-23 and 4-24. In samples Nos. 4-20 to 4-22, further, it was easier to discriminate used corners and the inserts were remarkably improved in wear resistance as compared with the comparative samples Nos. 4-23 and 4-24. In CBN sintered body portions of a sample No. 4-1, both the flanks and the cutting faces remained black after coating and it was impossible to discriminate used corners. In a sample No. 4-4, coating layers were chipped after 5 minutes from starting of cutting. Thus, it is understood that proper thicknesses of the coating layers are 0.1 to 10 μm in relation to the flanks. A comparative sample No. 4-25 caused de-brazing after 30 minutes from starting of cutting.

EXAMPLE 6

A composite sintered body of a sandwich structure having CBN sintered bodies containing 85 percent by volume of CBN and a rest or remainder consisting of borides and carbides of W and Co, borides of TiN, Al and Ti, AlN and unavoidable impurities was formed in a similar manner to Example 5. Metal Ti foil was introduced during charging of the powder, to form interfacial layers consisting of Ti, which is a high melting point metal, along interfaces between an intermediate layer consisting of cemented carbide and CBN sintered body layers. A sintered body insert for cutting having a triangular major surface shape shown in FIG. 5 was prepared from this composite sintered body. Coating layers shown in Tables 7 and 8 were formed on samples of this sintered body insert for cutting, by arc ion plating PVD and plasma CVD. Radii of noses R of cutting edges were set at 1.2 mm, and the samples of the insert were used for high efficiency cutting of SKH51 workpieces under the conditions described below. In order to provide coating layers only on cutting faces as shown in a sample No. 5-6, the sintered body insert for cutting was first entirely coated and thereafter only the flanks were polished. As to samples Nos. 5-1, 5-2 and 5-7, TiCN layers were formed by medium CVD under conditions of a furnace temperature of 800° C., a furnace pressure of 30 Torr, a reaction gas composition of 95.4 vol. % $H_2$–4 vol. % $TiCl_4$–0.6 vol. % $CH_3CN$ and a reaction time of 6 hours, and thereafter single layers of $Al_2O_3$ or multilayer films prepared by stacking at least pairs of TiCN and $Al_2O_3$ layers were formed by ordinary CVD. As to samples Nos. 5-3 to, 5-6 and 5-8, on the other hand, first layers were coated by arc evaporation ion plating PVD and the arc ion plating shown in FIGS. 13A and 13B similarly to Example 5, and thereafter outermost layers were coated by ordinary thermal CVD with another film forming apparatus. For the purpose of comparison, a cutting test was made also on a brazed insert shown in FIG. 8B and a sintered body insert for cutting shown in FIG. 5, including no interfacial layers between an intermediate layer and CBN sintered body layers.

Workpieces: Round bar of SKH51 having hardness HRC64

Peripheral Cutting Speed: 80 m/min.

Depth of Cut: 0.75 mm

Feed Rates: 0.1 mm/rev.

Type of Cutting: Wet

Cutting Time: 15 minutes

Figure 11C:
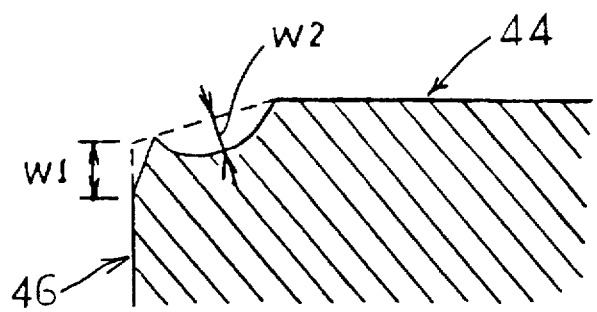
FIG. 11C is an enlarged sectional view showing a portion close to a cutting edge of an insert for illustrating a definition of a flank wear width W1 and a crater wear width W2.

Tables 7 and 8 show the results of flank wear widths W1 and crater wear widths W2 as defined in FIG. 11C, after the cutting test.

TABLE 7

Structure and Thickness of Coating Layer

| Sample No. | Flank - First Layer Composition | μm | Flank - Outermost Layer Composition | μm | Flank - Average Film Thickness (μm) | Cutting Face - First Layer Composition | μm | Cutting Face - Outermost Layer Composition | μm | Cutting Face - Average Film Thickness (μm) | Flank Wear Width (mm) | Crater Wear Width (mm) |
|---|---|---|---|---|---|---|---|---|---|---|---|---|
| 5-1 | TiCN | 5 | $Al_2O_3$ | 4 | 9 | TiCN | 7 | $Al_2O_3$ | 8 | 15 | 0.280 (0.560) | 0.040 Finely chipped |
| 5-2 | TiCN | 6 | $Al_2O_3$ | 4 | 10 | TiCN | 8 | $Al_2O_3$ | 9 | 17 | — | Separated immediately after starting of cutting |
| 5-3 | $(Ti_{0.5}Al_{0.5})N$ | 4 | $Al_2O_3$ | 3 | 7 | $(Ti_{0.5}Al_{0.5})N$ | 5 | $Al_2O_3$ | 7 | 12 | 0.195 (0.408) | 0.035 Finely chipped |
| 5-4 | Alternately stacked TiN Layers (5 nm) and AlN layers (3 nm) (Superlattice stacked layer compound film) | 4 | $Al_2O_3$ | 3 | 7 | Alternately stacked TiN layers (5 nm) and AlN layers (3 nm) (Superlattice stacked layer compound film) | 4 | $Al_2O_3$ | 7 | 11 | 0.155 (0.380) | 0.040 Finely chipped |
| 5-5 | Alternately stacked TiN layers (5 nm) and AlN layers (3 nm) (Super lattice stacked layer compound film) | 7 | Alternately stacked layers of TiCN (0.3 μm) and $Al_2O_3$ (0.7 μm) | 3 | 10 | Alternately stacked TiN layers (5 nm) and AlN layers (3 nm) (Superlattice stacked layer compound film) | 4 | Alternately stacked layers of TiCN (0.3 μm) and $Al_2O_3$ (0.7 μm) | 7 | 11 | 0.165 (0.360) | 0.045 |
| 5-6 | — | — | — | — | — | Alternately stacked TiN layers (5 nm) and AlN layers (3 nm) | 4 | Alternately stacked layers of TiCN (0.3 μm) and $Al_2O_3$ (0.7 μm) | 7 | 11 | 0.275 (0.300) | 0.050 |

Note) Parenthesized numerals in flank wear width: boundary wear

TABLE 8

Structure and Thickness of Coating Layer on Flank

Figure 5:
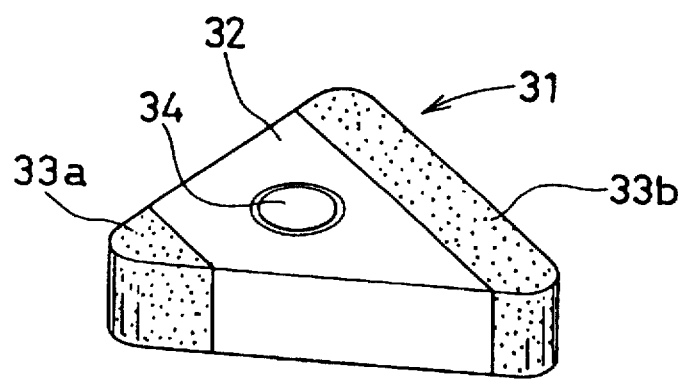
FIG. 5 is a perspective view showing a substantially equilateral-triangular shaped sintered body insert for cutting according to an Example of the present invention, having at its center a through hole for fastening the insert to a holder.
Figure 8B:
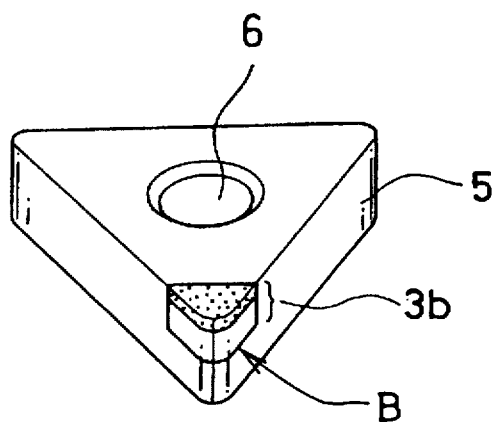

| Sample No. | Flank Composition | Flank Average Film Thickness (μm) | Cutting Face Composition | Cutting Face Average Film Thickness (μm) | Flank Wear Width (mm) | Crater Wear Width (mm) |
|---|---|---|---|---|---|---|
| 5-7 | TiCN | 9 | TiCN | 14 | 0.275 (0.345) | 0.075 |
| 5-8 | Alternately stacked TiN layers (5 nm) and AlN layers (3 nm) (Superlattice stacked layer compound film) | 8 | Alternately stacked TiN layers (5 nm) and AlN layers (3 nm) (Superlattice stacked layer compound film) | 13 | 0.155 (0.350) | 0.065 |
| 5-9 | Brazed insert shown in FIG. 8B | | | Separated immediately after starting of cutting | | |
| 5-10 | Sintered body insert for cutting shown in FIG. 5 having no interfacial layer between CBN sintered body and intermediate layer of cemented carbide | | | separated along interface between CBN sintered body and intermediate layer after 14 minutes | | |

Note) Parenthesized numerals in flank wear width: boundary wear

It is understood from the results of samples Nos. 4-1, 5-1 and 5-2 that proper thicknesses of the coating layers are 0.1 to 15 μm in relation to the cutting faces. It is also understood from the results of samples Nos. 5-1 and 5-3 to 5-8 that $Al_2O_3$ is most suitable for suppressing crater wear, and that a multilayer film formed by stacking at least pairs of $Al_2O_3$ and TiCN layers is more suitable due to excellent chipping resistance. It has been clarified from the result of the sample No. 5-6 that boundary wear can be reduced by coating only cutting faces. Further, it is understood from the results of samples Nos. 5-9 and 5-10 that an insert having interfacial layers consisting of Ti, which is a high melting point metal, along interfaces between an intermediate layer of cemented carbide and CBN sintered body layers is excellent in strength, in order to cut workpieces having high cutting resistance such as those employed in Example 6.

EXAMPLE 7

Each sample of a sintered body insert for cutting consisting of diamond or CBN sintered bodies employed in Example 4 or 6, prepared by coating each of flanks and cutting faces with a TiCN layer of 8 μm, was subjected to the following cutting test. A round bar which was prepared by combining an FCD550 member and a 16% Si—Al alloy to be at a cutting ratio of 2:3 was employed as a workpiece, whose outer periphery was cut at a cutting speed of 250 m/min., a depth of cut of 0.25 mm and a feed rate of 0.2 mm/rev. in dry type cutting for 15 minutes. For the purpose of comparison, the same cutting test was made on comparative samples of a sintered body insert for cutting consisting of the diamond or CBN sintered bodies employed in Example 4 or 6 with no coating layers. Table 9 shows the results.

TABLE 9

| Sample No. | Type of Sintered Insert for Cutting | Flank Wear Width (mm) |
|---|---|---|
| 6-1 | Sintered body insert for cutting employing CBN sintered body | Chipped in 5 minutes |
| 6-2 | Coated sintered body insert for cutting employing CBN sintered body | 0.125 |
| 6-3 | Sintered body insert for cutting employing diamond sintered body | 0.278 |
| 6-4 | Coated sintered body insert for cutting employing diamond sintered body | 0.118 |

From the results of samples Nos. 6-1 to 6-4, it has been clarified that a sintered body insert for cutting employing diamond or CBN sintered bodies with a coating thereon provides an excellent tool life in co-cutting of ferrous and non-ferrous materials.

The structures of the sintered body inserts for cutting described with reference to Examples and methods of manufacturing the same are merely typical examples. Other various modes are employable so far as the same are within the scope of the present invention described in claims, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite sintered body insert for cutting, comprising:
    an intermediate layer consisting of a material selected from the group consisting of cemented carbide, ferrous metals and high melting point metals, and
    a first layer and a second layer, each consisting of respective hard sintered bodies containing cubic boron nitride or diamond, wherein said first and second layers are respectively above and below said intermediate layer with said intermediate layer therebetween and are bonded with said intermediate layer by sintering, wherein said sintered body insert has a configuration including at least one nose and at least one flank adapted for carrying out cutting, and including front and rear surfaces that each respectively extend across said first layer, said intermediate layer and said second layer, and that define respective cutting faces, wherein all of said at least one nose and said at least one flank are located on at least one of said first and second layers, and wherein respective centers of gravity of said cutting faces and a center of gravity of said insert are located in said intermediate layer.

2. The sintered body insert for cutting in accordance with claim 1, further comprising interface layers of at least one component selected from the group consisting of at least one metal element belonging to the groups 4a, 5a and 6a of the periodic table, at least one compound selected from nitrides, carbides and oxides of said at least one metal element, and solid solutions thereof, wherein said interface layers are respectively arranged at respective interfaces between said intermediate layer and said first and second layers.

3. The sintered body insert for cutting in accordance with claim 1, wherein said first and second layers have respective vertical thicknesses of at least 1.0 mm and less than 4.0 mm, wherein said vertical thicknesses are measured in a direction substantially parallel to planes of said front and rear surfaces.

4. The sintered body insert for cutting in accordance with claim 1, wherein said composite sintered body insert has a lateral thickness, defined as a distance between said front and rear surfaces defining said cutting faces, that is at least 1.5 mm and less than 5.0 mm.

5. The sintered body insert for cutting in accordance with claim 1, wherein said first and second layers extend on layer planes that are substantially parallel to each other and substantially perpendicular to said front and rear surfaces.

6. The sintered body insert for cutting in accordance with claim 1, wherein interface planes are respectively formed between said first layer and said intermediate layer and between said second layer and said intermediate layer, and wherein said interface planes are substantially perpendicular to a plane of said cutting faces defined by said front and rear surfaces.

7. The sintered body insert for cutting in accordance with claim 1, wherein each of said first and second layers extends completely through a thickness of said insert from said front surface to said rear surface, and wherein each of said front and rear surfaces defining said cutting faces respectively includes a first surface portion defined by a side surface of said first layer, a second surface portion defined by a side surface of said second layer, and an intermediate surface portion defined by a side surface of said intermediate layer and located between said first and second surface portions.

8. The sintered body insert for cutting in accordance with claim 1, further comprising coating layers consisting of at least one component selected from the group consisting of at least one metal element belonging to the groups 4a, 5a and 6a of the periodic table and Al, Si, B, at least one compound selected from nitrides, carbides and oxides of said at least one metal element, and solid solutions thereof, wherein said coating layers are arranged on respective surfaces of only said cutting faces or are arranged on respective surfaces of said cutting faces and of said at least one flank.

9. The sintered body insert for cutting in accordance with claim 8, wherein each said coating layer consists of a (Ti, Al) N film.

10. The sintered body insert for cutting in accordance with claim 8, wherein each said coating layer consists of a superlattice multilayer compound film comprising repetitively stacked TiN and AlN layers having a cubic X-ray diffraction pattern as a whole, and having a thickness of each of said stacked layers being at least 0.2 nm and not more than 20 nm.

11. The sintered body insert for cutting in accordance with claim 8, wherein each said coating layer consists of a superfine grain multilayer film comprising at least a pair of TiN and AlN layers each consisting of superfine grains having a grain size of at least 1 nm and not more than 50 nm, wherein each said layer has a thickness of at least 1 nm and not more than 60 nm.

12. The sintered body insert for cutting in accordance with claim 8, wherein each said coating layer consists of at least one compound selected from nitrides, carbides and oxides of Ti and solid solutions thereof.

13. The sintered body insert for cutting in accordance with claim 8, further comprising an outer layer consisting of a single layer of $Al_2O_3$ or a multilayer film comprising a stack of at least a pair of $Al_2O_3$ and TiCN layers, wherein said outer layer is arranged on an outermost surface of each said coating layer.

14. The sintered body insert for cutting in accordance with claim 8, further comprising an outer layer consisting of a single layer of $Al_2O_3$ or a multilayer film comprising a stack of at least a pair of $Al_2O_3$ and TiCN layers, wherein said outer layer is arranged on an outermost surface of only at least one of said coating layers that is arranged on said surfaces of said cutting faces.

15. The sintered body insert for cutting in accordance with claim 8, wherein said coating layers respectively comprise repetitively stacked layers, and an outermost one of said stacked layers is a TiN layer.

16. The sintered body insert for cutting in accordance with claim 8, wherein said coating layers respectively have total film thicknesses of at least 0.1 μm and not more than 15 μm in portions at said cutting faces, and of at least 0.1 μm and not more than 10 μm in portions at said at least one flank.

17. A method of manufacturing the sintered body insert for cutting according to claim 1, comprising the steps of:
    forming a sandwich sintered body having said first and second layers, and said intermediate layer therebetween;
    performing electrodischarge machining for cutting said sandwich sintered body along four planes that are perpendicular to said first and second layers and to each other, and that define said front and rear surfaces and two side surfaces, so as to form said configuration as a rectangular parallelepiped with said first layer, said intermediate layer and said second layer aligned with each other in a vertical direction; and
    performing grinding or electrodischarge machining on said sandwich sintered body after said cutting for forming said at least one nose and said at least one flank located on at least one of said first and second layers, and such that said intermediate layer includes said centers of gravity of said cutting faces and said center of gravity of said insert.

18. The method of manufacturing the sintered body insert for cutting in accordance with claim 17, further comprising a step of forming coating layers consisting of at least one component selected from the group consisting of metal elements belonging to the groups 4a, 5a and 6a of the periodic table, Al, Si and B, at least one compound selected from nitrides, carbides and oxides of said at least one metal element, and solid solutions thereof, by physical vapor deposition or chemical vapor deposition.

19. The sintered body insert for cutting in accordance with claim 8, wherein said coating layers are arranged only on said surfaces of said cutting faces.

20. The sintered body insert for cutting in accordance with claim 8, wherein said coating layers are arranged on said surfaces of said cutting faces and of said at least one flank.

* * * * *

UNITED STATES PATENT AND TRADEMARK OFFICE
CERTIFICATE OF CORRECTION

PATENT NO. : 5,712,030
DATED : Jan. 27, 1998
INVENTOR(S) : Goto et al.

It is certified that error appears in the above-identified patent and that said Letters Patent is hereby corrected as shown below.

On the title page, under [56] References Cited, under U.S. PATENT DOCUMENTS,
line 7, delete "5,135,961" and instead insert --5,135,061--;

under FOREIGN PATENT DOCUMENTS,
following line 1, insert the following References:

| | | |
|---|---|---|
| 61-183,187 | 8/1986 | Japan |
| 1-96083 | 4/1989 | Japan |
| 1-96084 | 4/1989 | Japan |
| 0,369,852 | 5/1990 | Europe |
| 2,086,430 | 5/1982 | United Kingdom |
| 2,019,267 | 10/1979 | United Kingdom |
| 0,223,585 | 5/1987 | Europe |
| 56-072,104 | 6/1981 | Japan |
| 0,454,114 | 10/1991 | Europe |
| 0,506,238 | 9/1992 | Europe |
| 2,498,962 | 8/1982 | France |

UNITED STATES PATENT AND TRADEMARK OFFICE
CERTIFICATE OF CORRECTION

PATENT NO. : 5,712,030
DATED : Jan. 27, 1998
INVENTOR(S) : Goto et al.

It is certified that error appears in the above-identified patent and that said Letters Patent is hereby corrected as shown below.

On the title page,
under [57] ABSTRACT,  line 9,  after "The" insert --insert--;

| | | |
|---|---|---|
| Col. 1, | line 6, | before "Field" delete "1."; |
| | line 15, | before "Description" delete "2."; |
| Col. 2, | line 15, | after "bodies" delete "a" and instead insert --9--; |
| Col. 3, | line 10, | after "cause" delete "de-brasing" and instead insert --de-brazing--; |
| Col. 4, | line 16, | after "flanks" delete "ere" and instead insert --are--; |
| | line 59, | after "flanks" delete "ere" and instead insert --are--; |
| Col. 5, | line 45, | after "20 nm" delete "." and instead insert --;--; |
| | line 52, | after "a" delete "singered" and instead insert --sintered--; |

UNITED STATES PATENT AND TRADEMARK OFFICE
CERTIFICATE OF CORRECTION

PATENT NO. : 5,712,030
DATED : Jan. 27, 1998
INVENTOR(S) : Goto et al.

It is certified that error appears in the above-identified patent and that said Letters Patent is hereby corrected as shown below.

| | | |
|---|---|---|
| Col. 6, | line 39, | after "employing" delete "en" and instead insert --an--; |
| | line 59, | after "by" delete "arch" and instead insert --arc--; |
| | line 60, | after "the" (first occurrence), delete "arch" and instead insert --arc--; |
| Col. 7, | line 1, | after "0.1" delete "µn" and instead insert --µm--; |
| | line 49, | after "carbides" delete "end" and instead insert --and--; |
| | line 60, | after "of" insert --the--; |
| Col. 8, | line 9, | after "insert" delete "as being" and instead insert --that has been--; |
| | line 32, | before ";" delete "stop" and instead insert --step--; |
| | line 58, | after "FIG." delete "12D" and instead insert --12B--; |
| | line 60, | after "and" delete "to" and instead insert --top--; |
| Col. 10, | line 20, | before "Round" delete "Workplaces" and instead insert --Workpiece:--; |
| | line 50, | after "AlN," delete "TiBz" and instead insert --$TiB_2$--; |
| Col. 12, | line 19, | after "impurities" delete ","; |

UNITED STATES PATENT AND TRADEMARK OFFICE
CERTIFICATE OF CORRECTION

PATENT NO. : 5,712,030
DATED : Jan. 27, 1998
INVENTOR(S) : Goto et al.

It is certified that error appears in the above-identified patent and that said Letters Patent is hereby corrected as shown below.

Col. 13, line 28, after "4-26," delete "4-2" and instead insert --4-27--;

Col. 15 und 16, under Table 6,
under Sample No. 4-26, Composition (first occurrence), line 2,
after "and" delete "$SI_3N_4$" and instead insert --$Si_3N_4$--;

Col. 17, line 27, after "introduced" delete "daring" and instead insert --during--;

Col. 18, line 26, before "Round" delete "Workpieces:" and instead insert --Workpiece:--;
line 30, after "Feed" delete "Rates:" and instead insert --Rate:--;

Col. 19 and 20, under Table 7,
under Sample No. 5-3, Flank Wear Width (mm), line 2,
delete "(0.408)" and instead insert --(0.400)--;
under Sample No. 5-4, Outermost Layer (first occurrence), line 1,
delete "$Al_3O_3$" and instead insert --$Al_2O_3$--;

UNITED STATES PATENT AND TRADEMARK OFFICE
CERTIFICATE OF CORRECTION

PATENT NO. : 5,712,030
DATED : Jan. 27, 1998
INVENTOR(S) : Goto et al.

It is certified that error appears in the above-identified patent and that said Letters Patent is hereby corrected as shown below:

Col. 21, under Table 8, line 1, after "Layer" delete "on Flank".

Signed and Sealed this

Twelfth Day of May, 1998

Attest:

BRUCE LEHMAN

*Attesting Officer*     *Commissioner of Patents and Trademarks*